Patented Sept. 14, 1954

2,689,165

UNITED STATES PATENT OFFICE 2,689,165

PROCESS FOR PRODUCING URANIUM TETRAFLUORIDE

Bernard George Harvey, Liverpool, England, assignor to Imperial Chemical Industries Limited, a corporation of Great Britain No Drawing. Application August 3, 1944,
Serial No. 547,975

Claims priority, application Great Britain
September 17, 1943

9 Claims. (Cl. 23—14.5)

This invention relates to improvements in the production of uranium compounds, and more particularly to the manufacture of uranium tetrafluoride.

In copending application Serial No. 547,976 of even date herewith, now abandoned, there is described a method for producing uranium tetrafluoride by treating an aqueous solution of a uranyl salt at an elevated temperature with both a reducing agent effective in acid solution, and an amount of hydrofluoric acid substantially in excess of that stoichiometrically necessary to form the tetrafluoride. Advantageously one of the reactants, for example the hydrofluoric acid, was first added to the uranyl salt solution, and the other reagent, suitably stannous chloride, was gradually added afterwards so that reduction and precipitation proceeded simultaneously. Uranium tetrafluoride produced by these methods frequently contains rare earth metal salts introduced as impurities in the raw material serving as the source of uranium. Though only present in small amounts of the order of 1 to 20 parts per million these rare earth metals are for some purposes undesirable. Thorium introduced in a similar way may also be present in small but undesirable quantities. Hereinafter in the specification and claims the term "trace element impurities" is used to denote the above impurities.

We have now found that uranium tetrafluoride much less contaminated with trace element impurities than when prepared by the above method, in which the reducing agent is added to a uranyl salt solution containing an excess of hydrofluoric acid, can be prepared from materials containing such impurities by first adding a small proportion of reducing agent so as to cause a small fraction, for example 1% to 5% of the uranium tetrafluoride to be precipitated, rejecting such precipitate, and then precipitating and recovering the remainder of the uranium tetrafluoride.

According to the present invention, therefore, a process for the production of uranium tetrafluoride with a reduced content of trace element impurities from an aqueous uranyl salt solution containing such impurities and also an excess of hydrofluoric acid over that required to form uranium tetrafluoride with the uranium in solution, comprises reducing sufficient of the uranyl salt in solution to cause a small fraction of the uranium to be precipitated as uranium tetrafluoride, removing such precipitate, reducing a further amount of the uranium in solution to the uranous condition, thereby causing it to be precipitated as uranium tetrafluoride, and recovering such uranium tetrafluoride.

By this means the small amounts of trace element impurities present are removed in the initial fraction which is rejected, and the bulk of the precipitate is thus obtained with correspondingly greater freedom from these impurities. The initial small precipitate of uranium tetrafluoride may be used for purposes in which the presence of the impurities is not harmful, or in processes in which they can be separated from the product. For example, the precipitate may be used in the production of uranium hexafluoride by reacting it with fluorine.

While the invention may be applied to any process in which uranium tetrafluoride is precipitated from any acid aqueous uranyl salt solution containing fluoride ions it is of particular value as applied to the process described in copending application Serial No. 547,976. Thus a solution of uranyl sulphate may be prepared as described in copending application Serial No. 519,643 filed January 25, 1944, now abandoned, using the minimum of oxidising agent, for example nitric acid, and only a slight excess of mineral acid over that required to dissolve the oxide. The uranyl sulphate solution is then mixed with concentrated aqueous hydrofluoric acid in amount corresponding to a substantial excess, for example 100% excess, over that necessary to form uranium tetrafluoride with the uranium in the solution, and the acidified solution is heated to an elevated temperature near the boiling point, for example 90° C. to 95° C. Stannous chloride is then added to the hot solution in amount corresponding to a small proportion of that necessary to reduce the uranyl salt to the uranous condition. The optimum amount will depend on whether any traces of oxidising agent remain from the previous operation in which such oxidising agent is employed to bring the uranium into solution as the uranyl salt. The first amount of stannous chloride added will reduce the oxidising agent, and only subsequent addition of stannous chloride will reduce the uranyl salt. In general a proportion suffices which is of the order of 1% to 5% of the uranous tetrafluoride to be precipitated, although more may be added if desired. As a result of this addition reduction of a small amount of uranyl salt occurs, and then precipitation of a correspondingly small amount of uranous tetrafluoride with which is associated substantially all of the rare earth metal impurities, and at least the majority of the thorium introduced into the solution with the uranium compound used as raw material. This small amount of precipitate is then removed, as by decantation or filtration, and the solution, if necessary after reheating, is treated with more stannous chloride to precipitate the remainder of the uranium as tetrafluoride, which is then collected, washed and dried. Suitably a small excess, for example 5% to 10% excess, of stannous chloride is used for the precipitation. The uranium tetrafluoride thus obtained is substantially free from rare earth metal impurities and contains at most a small proportion of thorium in the raw material.

The process may be modified in various ways if desired. Thus instead of using stannous chloride to carry out the reduction of the first portion of the uranyl sulphate, another reducing agent, effective in acid solution, such as granulated zinc or tin may be used, or electrolytic reduction may be employed; and such other reducing agent may also be used for bringing about the precipitation of the major proportion of the uranium tetrafluoride. Instead of starting with a uranyl sulphate solution, a solution of other uranyl salts may be used, such as a solution of the acetate or chloride. Where the solution is made by dissolving an oxide or other base in an excess of acid, for example an excess of hydrochloric acid or sulphuric acid as described in copending application Serial No. 519,643 filed January 25, 1944 the fluoride may be introduced as a soluble salt, for example sodium or ammonium fluoride. In the present specification and claims the presence of a soluble fluoride in an acid solution of uranyl salt is deemed to be equivalent to the presence of hydrofluoric acid.

The following example illustrates but does not limit the invention, all parts being parts by weight.

Example

As a raw material uranium trioctoxide was used containing a small amount of thorium and rare earth metals in the following amounts (determined by a spectroscopic method):

| Element | parts per million |
|---|---|
| Gd | 2.5 |
| Sm | 1 |
| Eu | 1 |
| Yb | 5 |
| Dy | 6.5 |
| Er | 6 |
| Ho | 1.5 |
| Tb | 3 |
| Yt | 20 |
| other rare earth metals | not detected |

424 parts of this material and 46.5 parts of concentrated nitric acid were added simultaneously in portions to a mixture at 73° C. of 158 parts of concentrated sulphuric acid with 400 parts of water, the rate of addition being such that reaction proceeded smoothly. When all the oxide and nitric acid had been added the solution was boiled for a short time to complete the reaction. 500 parts of water were added to prevent recrystallisation of the uranyl sulphate produced, and the solution was filtered. After filtration 505 parts of water were added and then 480 parts of 50% aqueous hydrofluoric acid, and the solution was heated to 95° C. 26 parts of 95% pure stannous chloride dihydrate were added in portions and the solution stirred for 30 minutes and then left so that the precipitated uranium tetrafluoride settled out. The supernatant liquor was then decanted off and treated with a further 367 parts of 95% stannous chloride dihydrate added in portions. A smooth but vigorous reaction ensued, and hydrated uranium tetrafluoride was precipitated. It was separated and washed by decantation five times and dried at 110° C. 448 parts of hydrated uranium tetrafluoride were obtained containing rare earth metals in the following amounts (determined by the spectroscopic method used in the case of the above oxide):

| Element | parts per million |
|---|---|
| Gd | 0.5 |
| Sm | <0.5 |
| Eu | 0.5 |
| Yb | 1 |
| Dy | 1 |
| Er | 0.5 |
| Ho | 0.5 |
| Tb | <0.5 |
| Yt | 3.5 |

$\beta$-Ray intensity measurements on the oxide and on the product indicated that 80% of the thorium isotope UX1 present had been removed and that therefore 80% of the thorium itself must have been removed, since no separation of the thorium isotopes could have occurred.

I claim:

1. A process for the production of uranium tetrafluoride with a decreased amount of trace element impurities from an aqueous uranyl salt solution containing such impurities and an excess of hydrofluoric acid over that stoichiometrically required to form uranium tetrafluoride with the uranium in solution, which process comprises reducing sufficient of the uranyl salt so as to cause only a small fraction of the uranium to be precipitated as uranium tetrafluoride which uranium tetrafluoride will include a major proportion of the trace element impurities, removing such precipitate, reducing a further quantity of the uranium in solution to the uranous condition, thereby causing it to be precipitated as uranium tetrafluoride, and recovering such uranium tetrafluoride.

2. A process for the production of uranium tetrafluoride with a decreased amount of trace element impurities from an aqueous uranyl salt solution containing such impurities and an excess of hydrofluoric acid over that stoichiometrically required to form uranium tetrafluoride with the uranium in solution which process comprises adding to the said solution sufficient of a reducing agent effective in acid solution so as to reduce only a small fraction of the uranium and thereby cause it to be precipitated as uranium tetrafluoride which uranium tetrafluoride will include a major proportion of the trace element impurities, removing such precipitate, adding a further quantity of a reducing agent effective in acid solution so as to reduce a further quantity of the uranium in solution and thereby cause it to be precipitated as uranium tetrafluoride, and recovering such uranium tetrafluoride.

3. A process for the production of uranium tetrafluoride with a decreased amount of trace element impurities from an aqueous uranyl salt solution containing such impurities, and an excess of hydrofluoric acid over that stoichiometrically required to form uranium tetrafluoride with the uranium in solution, which process comprises adding to the said solution at an elevated temperature sufficient stannous chloride so as to reduce only a small fraction of the uranium and thereby cause it to be precipitated as uranium tetrafluoride which uranium tetrafluoride will include a major proportion of the trace element impurities, removing such precipitate, adding a further quantity of stannous chloride so as to reduce a further quantity of the uranium in solution and thereby cause it to be precipitated as uranium tetrafluoride, and recovering such uranium tetrafluoride.

4. A process for the production of uranium tetrafluoride with a decreased amount of trace element impurities from an aqueous uranyl salt solution containing such impurities and an excess of hydrofluoric acid over that stoichiometrically required to form uranium tetrafluoride with the uranium in solution, which comprises reducing at an elevated temperature with sufficient metallic zinc so as to reduce only a small fraction of the uranium and thereby cause it to be precipitated as uranium tetrafluoride which uranium tetrafluoride will include a major proportion of the trace element impurities, removing such precipitate, adding a further quantity of metallic zinc so as to reduce a further quantity of the uranium in solution and thereby cause it to be precipitated as uranium tetrafluoride, and recovering such uranium tetrafluoride.

5. A process for the production of uranium tetrafluoride with a decreased amount of trace element impurities from an aqueous uranyl salt solution containing such impurities and at least twice the amount of hydrofluoric acid stoichiometrically required to form uranium tetrafluoride with the uranium in solution, which process comprises reducing sufficient of the uranyl salt so as to cause only a small fraction of the uranium to be precipitated as uranium tetrafluoride which uranium tetrafluoride will include a major proportion of the trace element impurities, removing such precipitate, reducing a further quantity of the uranium in solution to the uranous condition, thereby causing it to be precipitated as uranium tetrafluoride and recovering such uranium tetrafluoride.

6. A process for the production of uranium tetrafluoride with a decreased amount of trace element impurities from an aqueous uranyl salt solution containing such impurities and at least twice the amount of hydrofluoric acid stoichiometrically required to form uranium tetrafluoride with the uranium in solution, which process comprises adding to the said solution sufficient of a reducing agent effective in acid solution so as to reduce only a small fraction of the uranium and thereby cause it to be precipitated as uranium tetrafluoride which uranium tetrafluoride will include a major proportion of the trace element impurities, removing such precipitate, adding a further quantity of a reducing agent effective in acid solution so as to reduce a further quantity of the uranium in solution and thereby cause it to be precipitated as uranium tetrafluoride, and recovering such uranium tetrafluoride.

7. A process for the production of uranium tetrafluoride with a decreased amount of trace element impurities from an aqueous uranyl salt solution containing such impurities and at least twice the amount of hydrofluoric acid stoichiometrically required to form uranium tetrafluoride with the uranium in solution, which process comprises adding to the said solution at an elevated temperature stannous chloride so as to reduce only a small fraction of the uranium and thereby cause it to be precipitated as uranium tetrafluoride which uranium tetrafluoride will include a major proportion of the trace element impurities, removing such precipitate, adding a further quantity of stannous chloride so as to reduce a further quantity of the uranium in solution, and thereby cause it to be precipitated as uranium tetrafluoride and recovering such uranium tetrafluoride.

8. A process for the production of uranium tetrafluoride with a decreased amount of trace element impurities from an aqueous uranyl salt solution containing such impurities and at least twice the amount of hydrofluoric acid stoichiometrically required to form uranium tetrafluoride with the uranium in solution, which process comprises adding to the said solution at an elevated temperature sufficient metallic zinc so as to reduce only a small fraction of the uranyl salt to the uranous condition and thereby cause it to be precipitated as uranium tetrafluoride which uranium tetrafluoride will include a major proportion of the trace element impurities, removing such precipitate, adding a further quantity of metallic zinc so as to reduce a further quantity of the uranium in solution and thereby to cause it to be precipitated as uranium tetrafluoride, and recovering such uranium tetrafluoride.

9. A process for the production of uranium tetrafluoride with a decreased amount of trace element impurities from an aqueous uranyl sulphate solution containing such impurities, which comprises adding thereto at least twice the amount of aqueous hydrofluoric acid stoichiometrically required to form uranium tetrafluoride with the uranium in solution, subsequently adding to the acid solution at a temperature near the boiling point sufficient stannous chloride to reduce approximately 5% of the uranium in solution and thereby cause it to be precipitated as uranium tetrafluoride which uranium tetrafluoride will include a major proportion of the trace element impurities, removing such precipitate, adding to the solution from which such precipitate has been removed, at a temperature near the boiling point, sufficient stannous chloride to reduce the remainder of the uranium to the uranous condition and thereby cause it to be precipitated as uranium tetrafluoride, and recovering such uranium tetrafluoride.

References Cited in the file of this patent

Mellor, "Comprehensive Treatise on Inorganic and Theoretical Chemistry," 1932, vol. 12, Longmans, Green & Co., London, New York, Toronto, pages 74, 76 and 88.